(12) United States Patent
Preister et al.

(10) Patent No.: US 11,466,228 B1
(45) Date of Patent: *Oct. 11, 2022

(54) FRICTION CONTROL AND CAPTIVE SEALANT FOR PRESSED WINDOWS

(71) Applicant: Endress+Hauser Optical Analysis, Inc., Ann Arbor, MI (US)

(72) Inventors: Jeremy David Preister, Fenton, MI (US); Joseph B. Slater, Dexter, MI (US); Michael G. Stidham, Ann Arbor, MI (US)

(73) Assignee: Endress+Hauser Optical Analysis, Inc., Ann Arbor, MI (US)

( * ) Notice: Subject to any disclaimer, the term of this patent is extended or adjusted under 35 U.S.C. 154(b) by 29 days.

This patent is subject to a terminal disclaimer.

(21) Appl. No.: 17/078,370

(22) Filed: Oct. 23, 2020

Related U.S. Application Data

(63) Continuation-in-part of application No. 16/178,851, filed on Nov. 2, 2018, now Pat. No. 10,816,373.

(51) Int. Cl.
*C10M 169/04* (2006.01)
*C10M 105/12* (2006.01)
(Continued)

(52) U.S. Cl.
CPC ...... *C10M 169/041* (2013.01); *C10M 105/12* (2013.01); *C10M 147/00* (2013.01);
(Continued)

(58) Field of Classification Search
CPC ...... F16J 15/02; G01D 11/26; G01N 21/8507; G01N 2201/0227; C10M 169/041; C10M 105/12; C10M 147/00; C10M 2207/0215; C10M 2213/062; C10N 2050/015; E06B 7/16
See application file for complete search history.

(56) References Cited

U.S. PATENT DOCUMENTS

| | | |
|---|---|---|
| 3,631,141 A | 12/1971 | Fang |
| 5,917,008 A | 6/1999 | Montagna et al. |

(Continued)

FOREIGN PATENT DOCUMENTS

DE 102006052209 B3 12/2007

OTHER PUBLICATIONS

"PTFE Coating Process," Fluro Precision Coatings, Jan. 4, 2017 (last accessed Mar. 16, 2021), 1 p.

*Primary Examiner* — Gilbert Y Lee
(74) *Attorney, Agent, or Firm* — Christopher R. Powers; Endress+Hauser (USA) Holding Inc.

(57) ABSTRACT

An improved method of sealing a window into an aperture in a body uses a lubricant comprising polymer particles suspended in a volatile, low viscosity, low surface tension carrier fluid. The carrier fluid is applied to one or both of the sidewalls of the window and aperture, and the window is pressed into the aperture such that the carrier fluid evaporates, leaving the polymer particles to fill interstitial surface voids, while enabling the sidewall of the window to make intimate mechanical contact with the sidewall of the aperture. While having broader application, the present disclosure finds particular utility in optical characterization techniques based upon the Raman effect and fluorescence probes used in process monitoring and control.

19 Claims, 3 Drawing Sheets

(51) Int. Cl.
*C10M 147/00* (2006.01)
*E06B 7/16* (2006.01)
*C10N 50/00* (2006.01)

(52) U.S. Cl.
CPC ....... *E06B 7/16* (2013.01); *C10M 2207/0215* (2013.01); *C10M 2213/062* (2013.01); *C10N 2050/015* (2020.05)

(56) References Cited

U.S. PATENT DOCUMENTS

| | | | | |
|---|---|---|---|---|
| 2003/0142304 | A1* | 7/2003 | Slater | G01N 21/8507 356/301 |
| 2004/0122280 | A1 | 6/2004 | Forney | |
| 2010/0140373 | A1* | 6/2010 | Myhre | F23R 3/002 239/71 |
| 2014/0126043 | A1* | 5/2014 | Senekerimyan | H05G 2/008 359/361 |

* cited by examiner

FRICTION CONTROL AND CAPTIVE SEALANT FOR PRESSED WINDOWS

CROSS-REFERENCE TO RELATED APPLICATION

The present continuation-in-part application is related to and claims the priority benefit of U.S. Nonprovisional patent application Ser. No. 16/178,851, filed Nov. 2, 2018, the entire contents of which are incorporated herein by reference.

TECHNICAL FIELD

The present disclosure relates generally to optical measurement probes and, in particular, to probes that utilize a window configuration suited to on-line process control and other applications and, more particularly, to an improved technique for bonding such a window to a probe body or process vessel.

BACKGROUND

Optical characterization techniques based upon the Raman effect and fluorescence have become important tools in process monitoring and control for industries involved with hazardous materials, pharmaceuticals, and so forth. In such applications, it is typical for probe having a sealed window to be introduced into the process flow, facilitating remote connection to analytical equipment through optical fibers, for example.

Current immersion window designs used by spectroscopic analysis systems rely on several techniques for sealing the window to the probe body. The two most general categories are elastomeric seals, which include O-rings, gaskets, adhesive, etc., and metal seals. O-rings and other elastomeric seals have temperature, hermeticity and chemical compatibility issues.

Metal seals can be subdivided into soft solder, metal spring seals (e.g., C-rings) and compression bonding. With C-rings, a standard metal C-ring may be deployed as the seal. However, this type of seal exhibits problems in achieving high levels of hermeticity, presents difficulties in making the window flush with the probe body housing, and leaves many micro-voids and dead volumes to trap sample material, making the technique unsuitable due to contamination transfer in life science applications.

In general, metal seals are the most desirable type, offering the potential of high temperature resistance, high pressure resistance, hermetic sealing, longevity and robustness. With brazing, sintering or fritting, a bonding material, usually a metal alloy or low melting point glass like material, is deployed to seal and hold the window in place. The brazed window seal is common in the spectroscopic probe industry. Shown in FIG. 1, such an arrangement includes a window 102, for example, sapphire, which is brazed to the surrounding probe body 104, conventionally using gold or a gold alloy 106. This technique has all the advantages of metal seals listed above, plus the fact that the sealing is done to the edge of the window thus leaving the surface flush to the outside of the probe without any special forming of the window itself. However, this technique can generate unwanted thermal stresses between the window and the probe body 104, and the choice of materials limits the application space due to corrosion resistance.

An alternative to the brazed window is the compression bonded window shown in FIG. 2. In this case, the window 202 is tapered and is pressed into the probe body 204. The interface may or may not have a ductile metal, such as gold, to aid in the sealing. This approach is inexpensive and quick but has the disadvantage of decreasing compression on the window as the probe body expands at high temperature, potentially causing seal failures.

The compression bonded window technique, described in U.S. Pat. No. 6,831,739 and incorporated herein by reference, uses a specially formed window that is pressed directly into a probe body, forming a permanent and hermetic seal with the corrosion resistant properties of the window and probe body materials. However, during manufacture, this approach presents difficulties in achieving the right combination of hermeticity and window retention without damaging the window or the probe body. Form and surface finishes of the window and probe body have to be very tightly controlled, as well as the pressing dynamics. In particular, to achieve a sufficient seal, the window must plastically deform the probe body housing with adequate retention force, such that the window does not come out, but with the press forces sufficiently low to prevent shear stresses on the window that could cause it to fracture. Meeting all of these requirements simultaneously has proven to be difficult in practice.

Accordingly, there remains a need for further contributions in this area of technology.

SUMMARY

According to one aspect of the present disclosure, a method of sealing a window into a body having an aperture with a sidewall includes providing a window with a front surface, a back surface and a sidewall, applying a lubricant that includes polymer particles to at least the sidewall of the window or the sidewall of the aperture, and pressing the window into the aperture in the body such that the carrier fluid evaporates, leaving the polymer particles to fill interstitial surface voids, while enabling intimate mechanical contact between the sidewall of the window and the sidewall of the aperture. The sidewall of the window is conformal to a sidewall of an aperture in a body, and the lubricant includes the polymer particles suspended in a volatile, low viscosity, low surface tension carrier fluid. In at least one embodiment, the window and aperture are circular.

In an embodiment, the polymer particles range in size from 0.25 to 16 microns. In an embodiment, the polymer particles have a nominal size of 2 to 4 microns. In an embodiment, the carrier fluid is alcohol or cyclohexane. In at least one embodiment, the carrier fluid is ethanol. In an embodiment, the lubricant has a mix ratio of 1:300 by weight of polymer to carrier fluid. In another embodiment, the lubricant has a mix ratio of 1:200 by weight of polymer to carrier fluid.

In a further embodiment, the polymer is polytetrafluoroethylene (PTFE) particles, and the lubricant is the PTFE particles suspended in a volatile, low viscosity, low surface tension carrier fluid.

In another embodiment, the window is composed of sapphire. In an embodiment, the front and back surfaces of the window are substantially parallel to one another. In another embodiment, the sidewall of the window and the sidewall of the aperture are tapered complementary to one another. In yet another embodiment, the sidewall of the window and the sidewall of the aperture have a taper in the range of 1 to 5 degrees. In an embodiment, the sidewall of the window and the sidewall of the aperture have a 3-degree locking taper. In an embodiment, the sidewall of the window has a surface polish in the range of 1 to 3 microns. In an embodiment, the sidewall of the aperture in the body has a roughness average of 4 to 8 microns RA.

In at least one embodiment, the body is composed of a metal or metal alloy. In an embodiment, the body is part of an optical measurement probe. In another embodiment, the body is part of a process vessel. In at least one embodiment, a force applied to the window during the pressing of the window into the aperture in the body is at least 50% less than the maximum tensile stress on the window. In another embodiment, a force applied to the window during the pressing of the window into the aperture in the body is at least 70% below the maximum tensile stress on the window.

BRIEF DESCRIPTION OF THE DRAWINGS

The described embodiments and other features, advantages and disclosures contained herein, and the manner of attaining them, will become apparent and the present disclosure will be better understood by reference to the following description of various embodiments of the present disclosure taken in junction with the accompanying drawings, wherein.

DETAILED DESCRIPTION

The present disclosure relates to an improved method of sealing a window into a body having an aperture with a sidewall. The present disclosure may be well suited for application in optical characterization techniques based upon the Raman effect and fluorescence, wherein sealed windows are used in probe bodies and in the walls of process vessels.

The method of the present disclosure improves upon compression bonded window techniques through the inclusion of a lubricant used to control the amount of friction experienced during the pressing process. Ideally, the lubricant would either completely disappear after the completion of the process or a material is used that is chemically and thermally compatible with target application environment of the probe.

In accordance with the present disclosure, a window is provided having front and back surfaces and a sidewall, wherein the sidewall of the window is conformal to a sidewall of an aperture in a body. A lubricant composed of polymer particles suspended in a volatile, low viscosity, low surface tension carrier fluid is applied to one or both of the sidewalls of the window and aperture, and the window is pressed into the aperture such that the carrier fluid evaporates, leaving residual polymer particles to fill interstitial surface voids, while allowing the sidewall of the window to make intimate mechanical contact with the sidewall of the aperture. The window and aperture may be generally circular in peripheral form.

Figure 1:
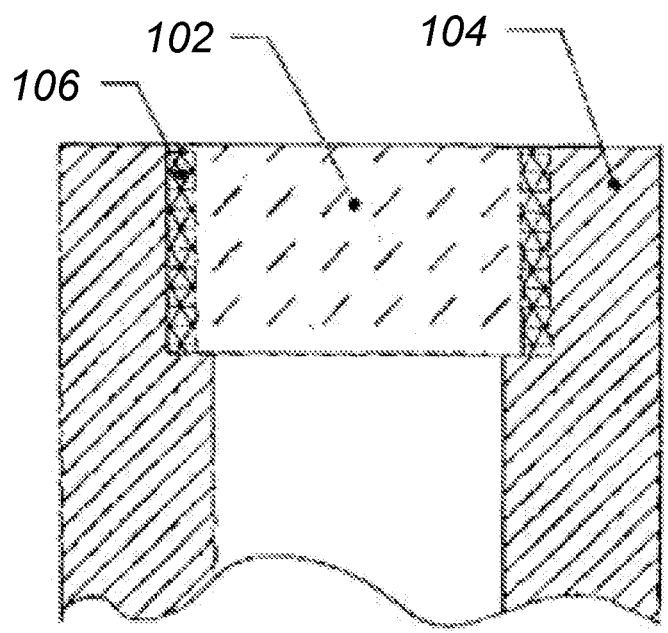
FIG. 1 shows a cross section that illustrates a prior art bonding technique wherein a window, typically sapphire, is brazed to a surrounding probe body, typically with gold or a gold alloy.
Figure 2:
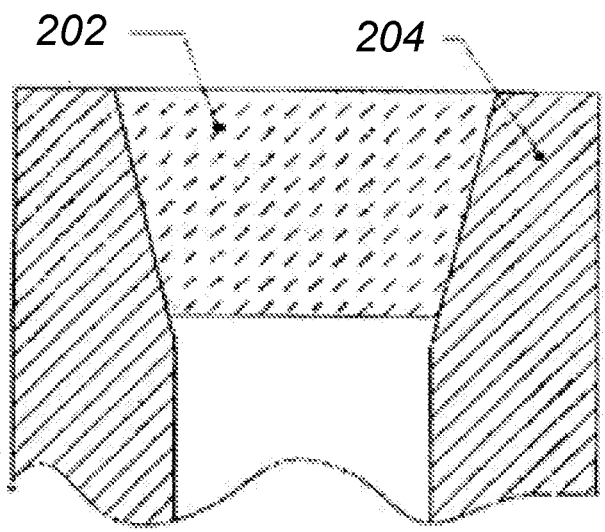
FIG. 2 illustrates a different prior-art technique in cross section, wherein a tapered window is pressed into a probe body.
Figure 3:
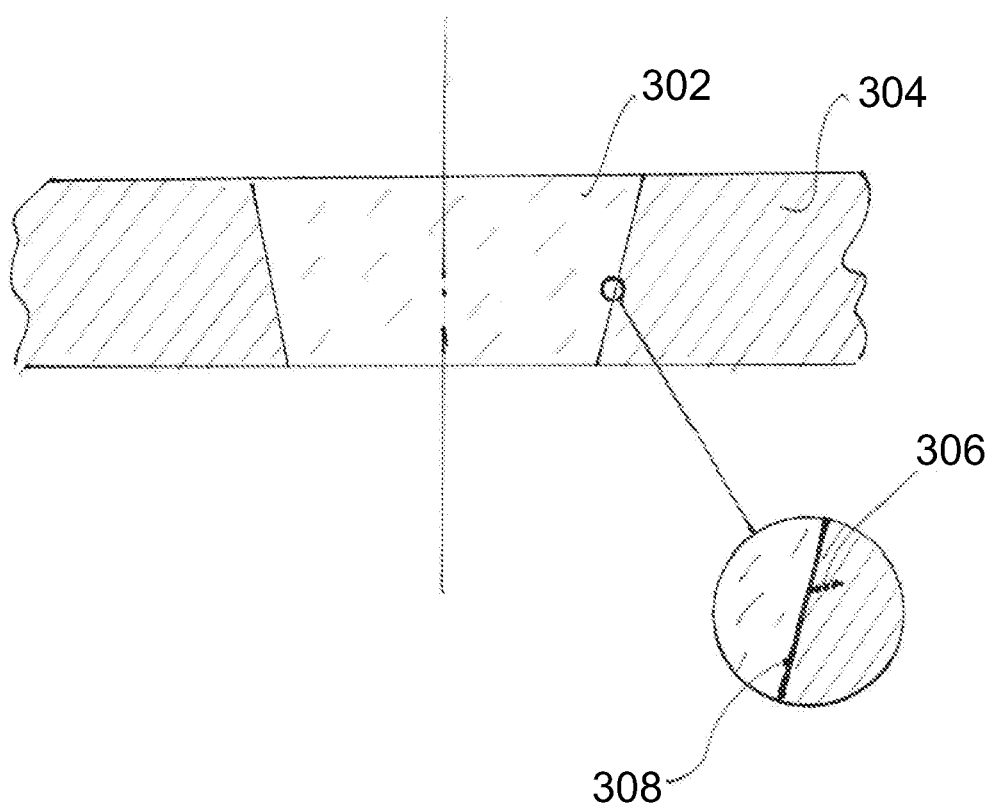
FIG. 3 is a diagram that illustrates an improved compression bonding approach according to the present disclosure, which adds a captive lubricant and sealant for friction control.

However, if too much polymer is present, the window may essentially "float" on a layer of the polymer and may not be adequately retained or sealed. According to at least one embodiment of the present disclosure, as shown in FIG. 3, mating dimensions are controlled such that a window 302 achieves an intimate, mechanical 'window-to-housing' contact after pressing into a body 304, with the residual polymer particles 306, 308 being at least partially, and in certain embodiments, substantially, compressed into and at least partially filing interstitial surface voids in the window 302 and body 304.

The lubricant may be a very dilute suspension of polymer micro-powder in a volatile, low viscosity, low surface tension fluid that wets the surfaces, evenly distributes the polymer powder, and evaporates quickly to leave a sparse distribution of polymer particles. Surface finishes of the housing and the window are such that the polymer is smeared over the surfaces during the pressing process, then cold flows into the voids of the microstructure, enabling direct window-to-housing contact but compressing and capturing the polymer, thus filling micro-voids and yielding a temperature and chemically resistant hermetic seal. Accordingly, the polymer particles (e.g., micro-powder) may be any suitable polymer, including thermoplastic, thermoset, elastomeric and semi-crystalline materials, which can be held in suspension in the carrier fluid and which have suitable cold flow properties. In at least one embodiment, the particles may be graphite instead of polymer.

The particles are sized as to be small enough to fill interstitial surface voids, micro-cracks and gaps in and between the window 302 and/or body 304 and large enough for suitable cold flow properties. In at least one embodiment, the polymer particles may range in size from 0.25 to 16 microns ($\mu$m). In certain embodiments, the polymer particles may have a nominal or average size range of 2-4 $\mu$m. The carrier fluid may be alcohol, such as ethanol, or cyclohexane. The window may be a sapphire window with the front and back surfaces of the window being substantially parallel to one another. The sidewalls of the window and aperture may be tapered in the range of 1-5 degrees. In certain embodiments, the sidewalls of the window and aperture may have an approximate 3-degree locking taper. In at least one embodiment, the sidewall of the window may have a surface polish in the range of 1-3 $\mu$m, and the sidewall of the aperture in the body may have an arithmetical mean roughness (Ra) of 4-8 $\mu$m Ra. The body may be composed of a metal or metal alloy.

In at least one embodiment according to the present disclosure, the polymer is polytetrafluoroethylene (PTFE, e.g., Teflon®) in powder form. In such an embodiment, the PTFE particles may range in size from 0.25 to 16 microns ($\mu$m). In certain embodiments, the PTFE particles may have a nominal or average size range of 2-4 $\mu$m. In further embodiments, the polymer may be linear polyethylene (PE), polypropylene (PP), polyamide (PA), polyamide 6, 6 (PA66), polymetric ester, polyolefin such as poly-alpha-olefin (PAO) or another suitable polymer. In a further embodiment, the polymer may be a thermoplastic elastomer with viscoelasticity.

Applicant performed testing using at least one embodiment disclosed herein. The testing described herein demonstrates that the dilute PTFE lubricant of the present disclosure enables a reduction in pressing forces below 70% of maximum tensile stress on the window, which is the most brittle component, while maintaining at least 50% of maximum retention forces. In an embodiment, the pressing forces may be below at least 50% of maximum tensile stress on the window. The following test trial provides details regarding the preparation and use of a friction reduction solution (i.e., lubricant) used to assemble a compression-bonded window in a probe body tip used in Raman spectroscopic applications. Two different window sealing surface finishes were tested, lapped and non-lapped.

Lubricant: PTFE powder, available from Micro Powders Inc, Terrytown N.Y., part number FLUO 300XF, having an average particle size in the range of 2-4 µm average, 16 µm max, in an ethanol carrier to suspend lubricant. Probe body tip sealing surface area: 0.035 in2; sealing surface finish: 4 µm or better. Probe window sealing surface area: 0.023 in2. Probe window sealing surface finish: lapped window—1 µm Ra or better; non-lapped window—1.5 µm Ra.

Procedure: PTFE solution applied to sealing surface of probe body tip. For lapped window, the lubricant was a 1:300 mix ratio by weight of PTFE to carrier fluid, dispensing 2 (0.00067 grams (g) PTFE) to 3 (0.0010 g PTFE) of lubricant solution. For the non-lapped window, the lubricant was a 1:200 mix ratio by weight of PTFE to carrier fluid, dispensing 3.0 of lubricant solution (0.001507 g PTFE). Window press force: <370 lb.

Figure 4:
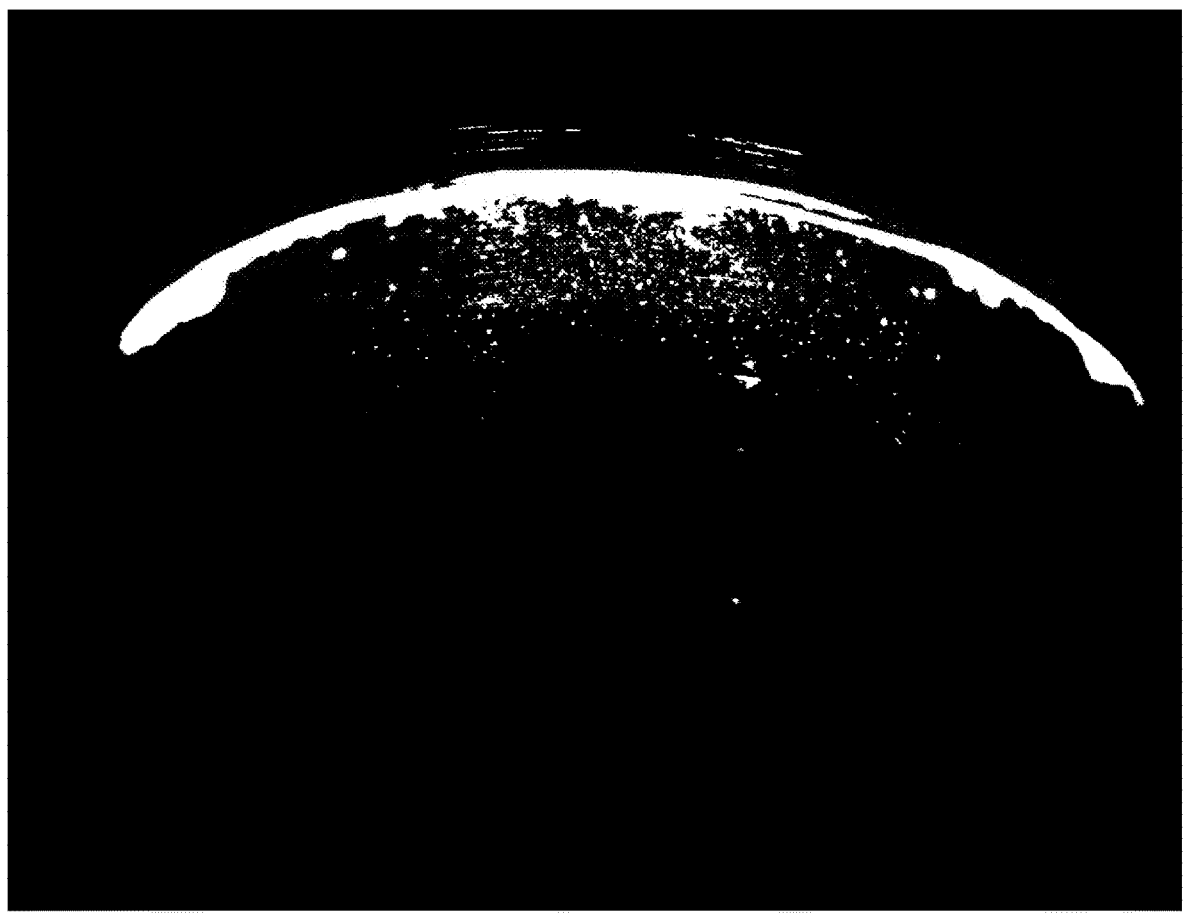
FIG. 4 is a photomicrograph showing fine PTFE powder applied to a Raman probe tip, after the alcohol carrier has evaporated, leaving only PTFE.

FIG. 4 is a photomicrograph showing the PTFE of the lubricant upon applying to the probe body tip and after the ethanol carrier has evaporated, leaving only PTFE particles compressed into micro-voids in the window and body.

While various embodiments of the disclosed method have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. The present disclosure is not intended to be exhaustive or to limit the scope of the subject matter of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible and still remain within the scope of the present disclosure.

The invention claimed is:

1. A method of sealing a window into a body having an aperture with a sidewall, the method comprising:
   providing a window with a front surface, a back surface and a sidewall, wherein the sidewall of the window is conformal to a sidewall of an aperture in a body;
   applying a lubricant to at least the sidewall of the window or the sidewall of the aperture,
   wherein the lubricant is comprised of polymer particles suspended in a volatile, low viscosity, low surface tension carrier fluid; and
   pressing the window into the aperture in the body such that the carrier fluid evaporates, leaving the polymer particles to fill interstitial surface voids, while enabling intimate mechanical contact between the sidewall of the window and the sidewall of the aperture.

2. The method of claim 1, wherein the polymer particles range in size from 0.25 to 16 microns.

3. The method of claim 1, wherein the polymer particles have a nominal size of 2 to 4 microns.

4. The method of claim 1, wherein the carrier fluid is alcohol or cyclohexane.

5. The method of claim 1, wherein the carrier fluid is ethanol.

6. The method of claim 1, wherein the window is composed of sapphire.

7. The method of claim 1, wherein the front and back surfaces of the window are substantially parallel to one another, and wherein the sidewall of the window and the sidewall of the aperture are tapered complementary to one another.

8. The method of claim 1, wherein the sidewall of the window and the sidewall of the aperture have a taper in the range of 1 to 5 degrees.

9. The method of claim 1, wherein the sidewall of the window and the sidewall of the aperture have a 3-degree locking taper.

10. The method of claim 1, wherein the body is composed of a metal or metal alloy.

11. The method of claim 1, wherein the sidewall of the window has a surface polish in the range of 1 to 3 microns.

12. The method of claim 1, wherein the sidewall of the aperture in the body has a roughness average of 4 to 8 microns RA.

13. The method of claim 1, wherein the body is part of an optical measurement probe or process vessel.

14. The method of claim 1, wherein the polymer of the polymer particles is polytetrafluoroethylene (PTFE).

15. The method of claim 1, wherein the lubricant has a mix ratio of 1:300 by weight of polymer particles to carrier fluid.

16. The method of claim 1, wherein the lubricant has a mix ratio of 1:200 by weight of polymer particles to carrier fluid.

17. The method of claim 1, wherein the polymer of the polymer particles is an elastomeric polymer.

18. The method of claim 1, wherein a force applied to the window during the pressing of the window into the aperture in the body is at least 50% less than the maximum tensile stress on the window.

19. The method of claim 1, wherein a force applied to the window during the pressing of the window into the aperture in the body is at least 70% below the maximum tensile stress on the window.

* * * * *